(12) United States Patent
Tanno et al.

(10) Patent No.: US 12,510,179 B2
(45) Date of Patent: Dec. 30, 2025

(54) VALVE CONTROL APPARATUS, VALVE CONTROL SYSTEM, VALVE CONTROL METHOD, AND VALVE CONTROL PROGRAM

(71) Applicant: Fujikin Incorporated, Osaka (JP)

(72) Inventors: Ryutaro Tanno, Osaka (JP); Yuya Suzuki, Osaka (JP); Tomoki Nakada, Osaka (JP); Yoshino Fujii, Osaka (JP)

(73) Assignee: Fujikin Incorporated, Osaka (JP)

( * ) Notice: Subject to any disclaimer, the term of this patent is extended or adjusted under 35 U.S.C. 154(b) by 106 days.

(21) Appl. No.: 18/520,774

(22) Filed: Nov. 28, 2023

(65) Prior Publication Data

US 2024/0175511 A1 May 30, 2024

(30) Foreign Application Priority Data

Nov. 30, 2022 (JP) .................................. 2022-192442

(51) Int. Cl.
  *F16K 37/00* (2006.01)
  *F16K 27/02* (2006.01)
  *F16K 31/02* (2006.01)

(52) U.S. Cl.
  CPC .......... *F16K 31/02* (2013.01); *F16K 27/0236* (2013.01); *F16K 37/0041* (2013.01); *Y10T 137/7761* (2015.04); *Y10T 137/8208* (2015.04)

(58) Field of Classification Search
  USPC ........................................... 137/487.5, 552.7
  See application file for complete search history.

(56) References Cited

U.S. PATENT DOCUMENTS

| | | | | |
|---|---|---|---|---|
| 5,251,148 A | * | 10/1993 | Haines | F16K 37/005 700/282 |
| 5,431,182 A | * | 7/1995 | Brown | F16K 37/0083 137/487.5 |
| 5,549,137 A | * | 8/1996 | Lenz | G05D 7/005 137/86 |
| 5,615,832 A | * | 4/1997 | Price | B05B 7/2491 137/489.5 |
| 6,021,799 A | * | 2/2000 | Price | B05B 7/1472 137/487.5 |
| 6,453,261 B2 | * | 9/2002 | Boger | G05B 5/01 702/150 |
| 6,505,907 B2 | * | 1/2003 | Ishinaga | B41J 2/1623 347/17 |
| 7,032,878 B2 | * | 4/2006 | Coura | F16K 37/0033 137/554 |

(Continued)

FOREIGN PATENT DOCUMENTS

| | | |
|---|---|---|
| JP | 6564544 B1 | 8/2019 |
| JP | 7136469 B2 | 9/2022 |
| WO | 2018/168872 A1 | 9/2018 |

*Primary Examiner* — Matthew W Jellett
(74) *Attorney, Agent, or Firm* — WCF IP

(57) ABSTRACT

A valve control apparatus including: an operating time measurement unit that measures an operating time of a valve based on an operation pressure of the valve and whether the valve is open or closed; and a command control unit that receives an opening command directed to the valve and transmitted from a control apparatus, and transmits the opening command to the valve in a delayed manner based on the operating time and a predetermined reference time.

10 Claims, 8 Drawing Sheets

(56) References Cited

U.S. PATENT DOCUMENTS

| | | | |
|---|---|---|---|
| 7,349,745 B2 * | 3/2008 | Junk | G05B 13/024 |
| | | | 700/28 |
| 8,307,845 B2 * | 11/2012 | Kouchi | G01F 1/363 |
| | | | 700/282 |
| 8,958,993 B2 * | 2/2015 | Maruyama | G05B 23/0283 |
| | | | 702/34 |
| 9,488,626 B2 * | 11/2016 | Suedel | F16K 37/0083 |
| 10,385,891 B2 * | 8/2019 | Slama | F16K 37/0025 |
| 10,866,581 B2 * | 12/2020 | Priisholm | F16K 1/446 |
| 11,162,606 B2 | 11/2021 | Suzuki et al. | |
| 11,725,677 B2 * | 8/2023 | Priisholm | F16K 31/1221 |
| | | | 251/30.01 |
| 12,012,979 B2 * | 6/2024 | Amstutz | F15B 21/082 |
| 2004/0211928 A1 * | 10/2004 | Coura | F16K 1/446 |
| | | | 251/129.04 |
| 2011/0048556 A1 * | 3/2011 | Carter | F16K 31/122 |
| | | | 137/559 |
| 2014/0374634 A1 * | 12/2014 | Ohtsuki | G05D 7/0635 |
| | | | 700/282 |
| 2017/0234438 A1 * | 8/2017 | Tanikawa | F16K 1/523 |
| | | | 251/294 |
| 2020/0080663 A1 * | 3/2020 | Suzuki | G01M 3/2876 |
| 2020/0224776 A1 * | 7/2020 | Yoshida | F16K 7/14 |
| 2020/0285256 A1 * | 9/2020 | Tanno | F16K 31/1225 |
| 2020/0348158 A1 * | 11/2020 | Sugita | G05D 7/0635 |
| 2021/0116047 A1 | 4/2021 | Suzuki et al. | |
| 2021/0278012 A1 | 9/2021 | Kitano et al. | |
| 2021/0302264 A1 * | 9/2021 | Tanno | G01M 3/2876 |
| 2022/0397885 A1 * | 12/2022 | Suzuki | F16K 31/1226 |

* cited by examiner

VALVE CONTROL APPARATUS, VALVE CONTROL SYSTEM, VALVE CONTROL METHOD, AND VALVE CONTROL PROGRAM

BACKGROUND

Technical Field

The present invention relates to a valve control apparatus, a valve control system, a valve control method, and a valve control program for adjusting response time of a valve so as to keep a flow rate of process gas being controlled by the valve at a constant level.

Related Art

Forming an extremely thin film is required in a film-forming process for forming a thin film on a surface of a semiconductor wafer. In recent years, a film-forming method called atomic layer deposition (ALD) has been used which is a method for forming a thin film with an atomic-level or molecular-level thickness.

Formation of such extremely thin films requires valves to perform more frequent precise opening/closing operation than ever before. In this regard, valves are configured such that a signal of an opening/closing command is transmitted from a control apparatus to an electromagnetic valve, and that operation pressure is supplied to or released from an on-off valve in accordance with the command.

However, response time of a valve regarding a response to the signal of the opening/closing command may change due to aging deterioration of the valve caused by wear of an O-ring, or the like. The change in the response time will change opening time of the valve, and thus becomes a major problem in a situation where a gas flow rate needs to be precisely controlled. Therefore, there is a need for a system that precisely adjusts response time so as to achieve a desired flow rate.

In this regard, WO 2018/168872 A discloses a valve including an information processing module that processes data detected by a pressure sensor, a temperature sensor, and a limit switch. Japanese Patent No. 7136469 discloses a fluid-driven valve that detects an anomaly by means of three sensors including a first pressure sensor that detects a pressure in a pressure receiving space, a second pressure sensor that detects a pressure in a non-pressure receiving space, and a position sensor that detects a distance from a piston. Japanese Patent No. 6564544 discloses a control method in which whether there is an anomaly in a highly airtight gate valve is determined by a plurality of pressure sensors, vibration sensors, position sensors, and the like arranged for the gate valve.

SUMMARY

One object of the present invention is to precisely adjust the response time of a valve with a simple configuration.

In order to achieve the above object, a valve control apparatus according to one aspect of the present invention includes: an operating time measurement unit that measures an operating time of a valve based on operation pressure of the valve and whether the valve is open or closed; and a command control unit that receives an opening command directed to the valve and transmitted from a control apparatus, and transmits the opening command to the valve in a delayed manner based on the operating time and a predetermined reference time.

The valve control apparatus may further include a delay time determination unit that determines a delay time for which the opening command is to be delayed, based on a difference between the operating time and the reference time, wherein the command control unit may delay the opening command for the delay time.

The delay time determination unit may be configured such that the delay time determination unit refers, as the operating time, to time from a predetermined time point at which the operation pressure increases to a predetermined time point at which opening operation corresponding to the increase is detected, and determines the delay time based on the operating time and the reference time.

The delay time determination unit may be configured such that the delay time determination unit refers, as the operating time, to time from a predetermined time point at which the operation pressure increases to a predetermined time point at which opening operation corresponding to the increase is detected, refers, as a second operating time, to time from a predetermined time point at which the operation pressure decreases to a predetermined time point at which closing operation corresponding to the decrease is detected, and determines the delay time based on the operating time, the reference time, the second operating time, and a predetermined second reference time.

In order to achieve the above object, a valve control method according to another aspect of the present invention includes: an operating time measurement step of measuring operating time of a valve based on operation pressure of the valve and whether the valve is open or closed; and an opening command control step of receiving an opening command directed to the valve and transmitted from a control apparatus, and transmitting the opening command to the valve in a delayed manner based on the operating time and a predetermined reference time.

In order to achieve the above object, a valve control program according to still another aspect of the present invention causes a computer to execute: an operating time measurement command to measure an operating time of a valve based on operation pressure of the valve and whether the valve is open or closed; and an opening command control command to receive an opening command directed to the valve and transmitted from a control apparatus, and to transmit the opening command to the valve in a delayed manner based on the operating time and a predetermined reference time.

In order to achieve the above object, a valve control system according to yet another aspect of the present invention includes: a valve; control apparatus that transmits an opening command to the valve; and a valve control apparatus that adjusts, as an operating time, time from a predetermined time point at which operation pressure changes to a predetermined time point at which operation corresponding to the change is detected, the operation pressure being applied to the valve, wherein the valve includes: an operation pressure sensor that measures the operation pressure applied to the valve; and an opening and closing sensor that detects at least whether the valve is open or closed, and the valve control apparatus includes: an operating time measurement unit that measures the operating time based on the operation pressure and whether the valve is open or closed; and a command control unit that receives the opening command directed to the valve and transmitted from the control apparatus, and transmits the opening command to the valve in a delayed manner based on the operating time and a predetermined reference time.

Note that the computer program can be provided by being stored in various recording media from which data can be read, or can be provided such that the computer program can be downloaded via a network such as the Internet.

According to the valve control apparatus of the present invention, the response time of a valve can be precisely adjusted with a simple configuration.

DETAILED DESCRIPTION

Figure 1:
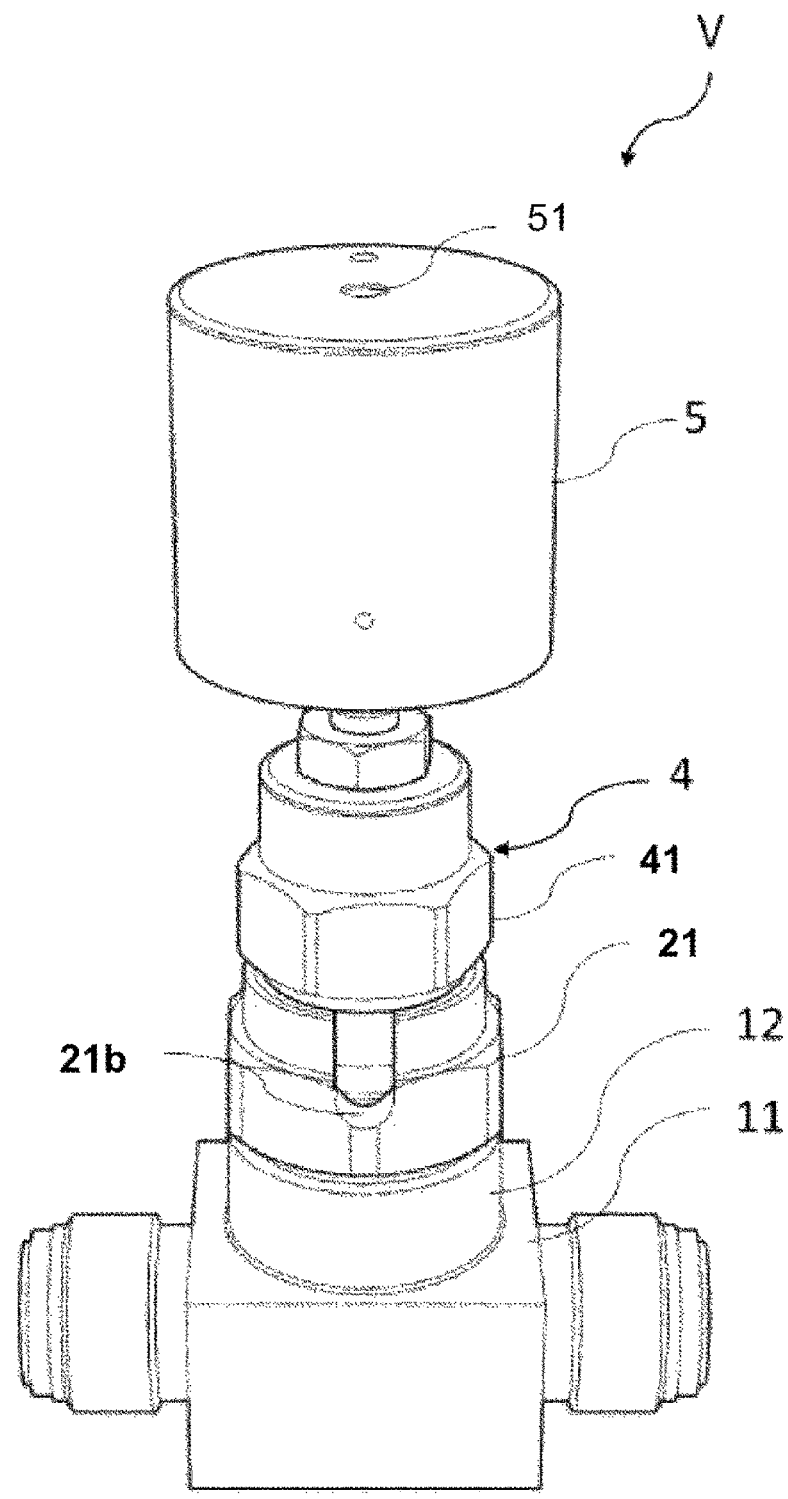
FIG. 1 is an external perspective view of a valve according to an embodiment of the present invention.

Hereinafter, a valve according to an embodiment of the present invention will be described with reference to the drawings.

Note that, in the following description, directions of members and the like may be referred to as up, down, left, and right depending on directions in the drawings for convenience, but these directions do not limit the directions of the members and the like at the time of implementation or use of the present invention.

As shown in FIG. 1, a valve V according to the present embodiment is an air-operated direct diaphragm valve that executes communication with other terminals or the like, and includes a built-in sensor that detects internal operation of the valve V.

Note that the other terminals mentioned here include devices and d apparatuses such as other fluid control apparatuses and flow rate control apparatuses in addition to a so-called computer such as a server.

Figure 2:
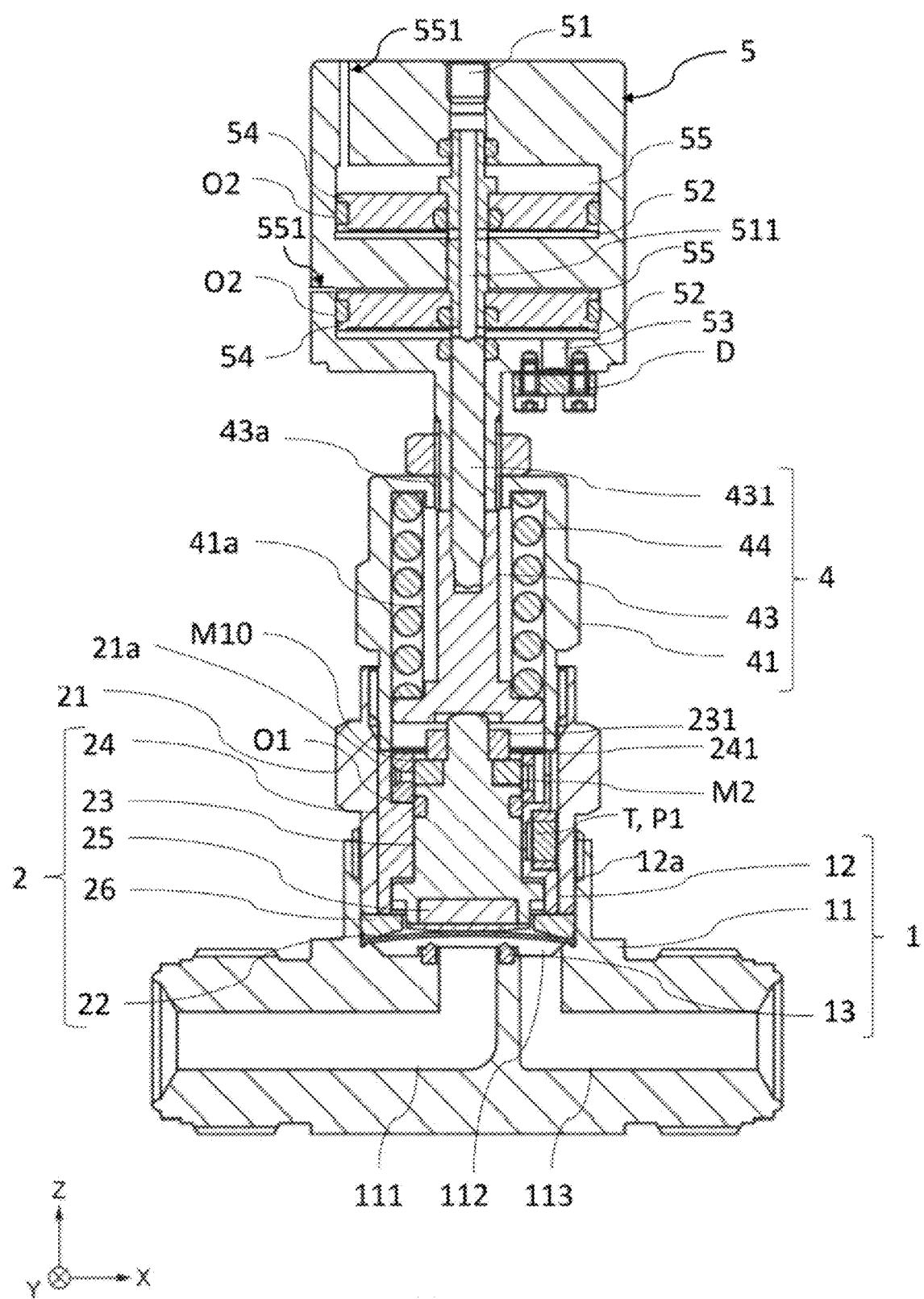
FIG. 2 is a longitudinal sectional view of the valve according to the present embodiment, which shows an internal structure of the valve in a state where the valve is open.

The valve V according to the present embodiment is a device capable of acquiring data regarding internal operation, and includes a valve body 1, a first bonnet portion 2, a second bonnet portion 4, and an actuator unit 5 as shown in FIGS. 1 and 2.

Valve Body 1

As shown in FIGS. 1 and 2, the valve body 1 includes a base portion 11, a cylindrical portion 12, and a seat 13. A flow path of process gas is formed in the base portion 11. The cylindrical portion 12 is substantially cylindrical and provided on the base portion 11. The seat 13 has an annular shape.

The base portion 11 has a rectangular shape in plan view, and serves as a portion to be installed on a board or a manifold block when a fluid control apparatus unitized by a plurality of the valves V is formed.

The cylindrical portion 12 has a hollow structure, and opens at an end on a side where a part of the first bonnet portion 2 is disposed. The inside of the hollow structure serves as a recess 12a in which the part of the first bonnet portion 2 is accommodated. An inflow path 111, an outflow path 113, and a valve chamber 112 are formed below the recess 12a and in the base portion 11. Fluid flows into the inflow path 111, and flows out from the outflow path 113. The valve chamber 112 communicates with the inflow path 111 and the outflow path 113. The inflow path 111, the outflow path 113, and the valve chamber 112 integrally form a flow path through which fluid flows.

The annular seat 13 is provided on a peripheral edge of the inflow path 111. A diaphragm 22 is provided on the seat 13. The diaphragm 22 allows fluid to flow through the inflow path 111 and the outflow path 113 or blocks the flow of the fluid, by coming into contact with or separating from the seat 13.

First Bonnet Portion 2

As shown in FIG. 2, the first bonnet portion 2 is disposed on the cylindrical portion 12 of the valve body 1. The first bonnet portion 2 includes a first bonnet body 21, the diaphragm 22, a disc 23, a sensor bonnet 24, a diaphragm holder 25, and a holder adapter 26.

Figure 3A:
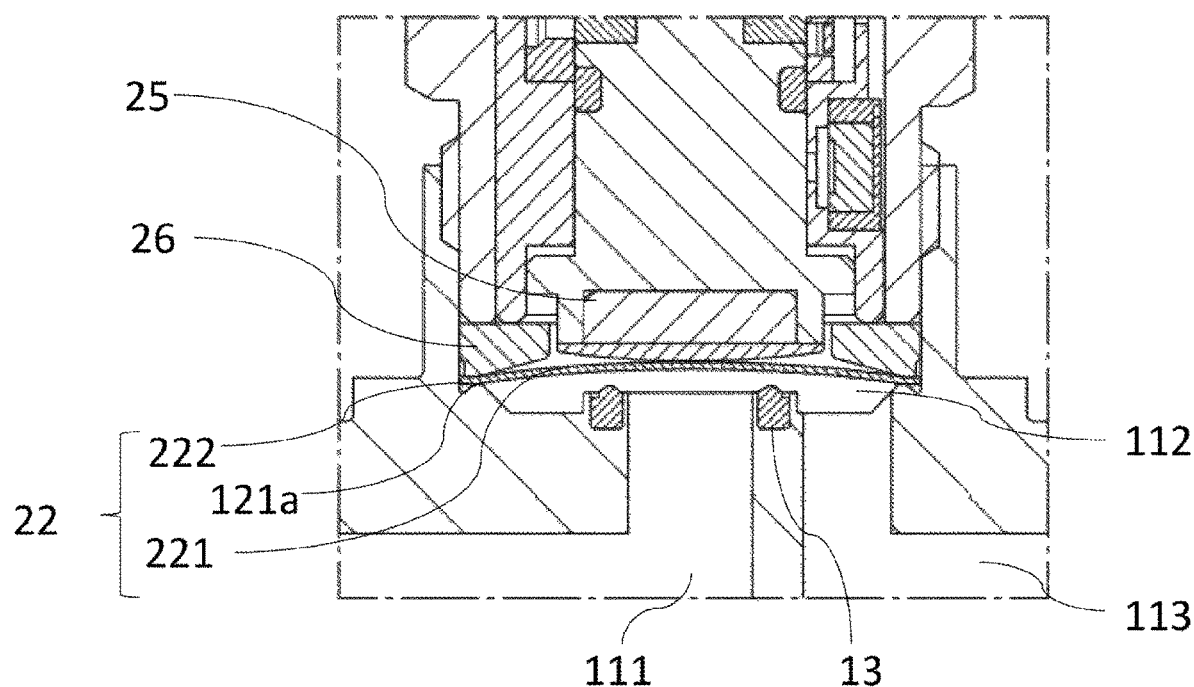
FIG. 3A is a partially enlarged longitudinal sectional view of the valve according to the present embodiment, which shows the internal structure of the valve in a state where the valve is open.
Figure 3B:
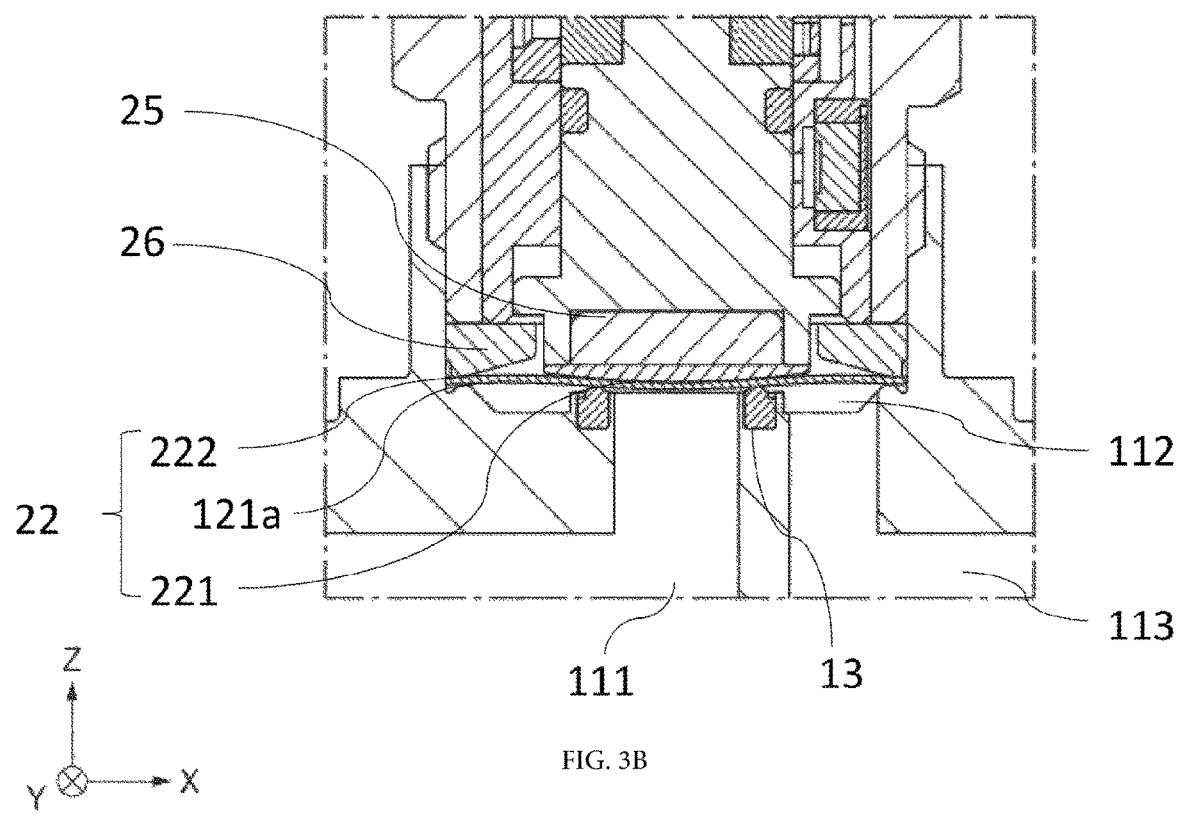
FIG. 3B is a partially enlarged longitudinal sectional view of the valve according to the present embodiment, which shows the internal structure of the valve in a state where the valve is closed.

As shown in FIGS. 3A and 3B, the diaphragm 22 is a spherical shell-shaped member made of metal, such as stainless steel or a Ni—Co-based alloy, or a fluorine-based resin and having a central portion 221 bulging in a convex shape. The diaphragm 22 isolates the inflow path 111 and the outflow path 113 from a space where the first bonnet portion 2 works.

The first bonnet body 21 is interposed between the cylindrical portion 12 and a second bonnet body 41.

The first bonnet body 21 has a substantially cylindrical shape, and has a central portion in which a through-hole 21a is provided along a length direction. The sensor bonnet 24 penetrates through the through-hole 21a. A lower end portion of the first bonnet body 21 is in contact with the holder adapter 26 to press the holder adapter 26 downward.

A slit 21b is provided in the first bonnet body 21. The slit 21b opens at one end opposite to the base portion 11, and penetrates the first bonnet body 21 from the outside toward the through-hole 21a.

When driving fluid for applying operation pressure is supplied to the diaphragm 22 to release the diaphragm 22 from pressing force applied by the diaphragm holder 25, the central portion 221 is displaced in a direction away from the seat 13 by its own restoring force and pressure in the flow path, and is separated from the seat 13. As a result, the valve chamber 112 is opened to allow the inflow path 111 and the outflow path 113 to communicate with each other. Meanwhile, when the driving fluid for applying operation pressure is discharged to cause the diaphragm 22 to be pressed by the diaphragm holder 25, the central portion 221 of the diaphragm 22 is displaced toward the seat 13, and comes into contact with the seat 13. As a result, the valve chamber 112 is blocked to cause the inflow path 111 and the outflow path 113 to be isolated from each other.

That is, the central portion 221 of the diaphragm 22 is a movable portion that is displaced by supplied driving fluid, and a peripheral edge portion 222 is an immovable portion that is not displaced even when driving fluid is supplied.

The peripheral edge portion 222 of the diaphragm 22 is in contact with the holder adapter 26 to be described below, and is sandwiched between the holder adapter 26 and a protrusion 121a (see FIGS. 3A and 3B) provided upward inside the recess 12a of the valve body 1.

The disc 23 is provided above the diaphragm 22. The disc 23 is supported by the sensor bonnet 24 in such a way as to be capable of vertically moving, and presses the central portion of the diaphragm 22 in conjunction with a stem 43 that slides.

An O-ring O1 is attached to an outer peripheral surface of the disc 23. The O-ring O1 seals a space between the disc 23 and an inner peripheral surface of the sensor bonnet 24.

The outer diameter of an upper portion of the disc 23 is smaller, and penetrates through a magnet holder M10. The magnet holder M10 is a substantially annular member that has been partially cut out, and a magnet is attached in the cutout portion. The magnet forms a magnetic sensor M to be described below, together with a magnetic body M2 attached to a sensor holder 241 fitted in a recess of the sensor bonnet 24. In addition, the magnet holder M10 has a recess in its outer periphery, and a positioning member such as a bolt penetrating the sensor holder 241 presses the recess. As a result, positional displacement of the magnet holder M10 is prevented. A locknut 231 is provided above the magnet holder M10 and put around an upper end of the disc 23 to prevent the magnet holder M10 from coming off.

The diaphragm holder 25 is coupled to a lower end of the disc 23. A lower surface of the diaphragm holder 25 is a convex surface bulging downward, and is in contact with the central portion 221 of the diaphragm 22 to press the diaphragm 22 in conjunction with the stem 43 that slides.

As shown in FIGS. 3A and 3B, a lower end of the diaphragm holder 25 is in contact with the central portion 221 of the diaphragm 22 regardless of whether the valve is open or closed. That is, an area of contact between the diaphragm holder 25 and the diaphragm 22 is constant regardless of whether the valve is open or closed. This configuration makes a heat transfer area of the diaphragm 22 constant regardless of whether the valve is open or closed, so that temperature can be accurately measured by a temperature sensor T to be described below.

Figure 4:
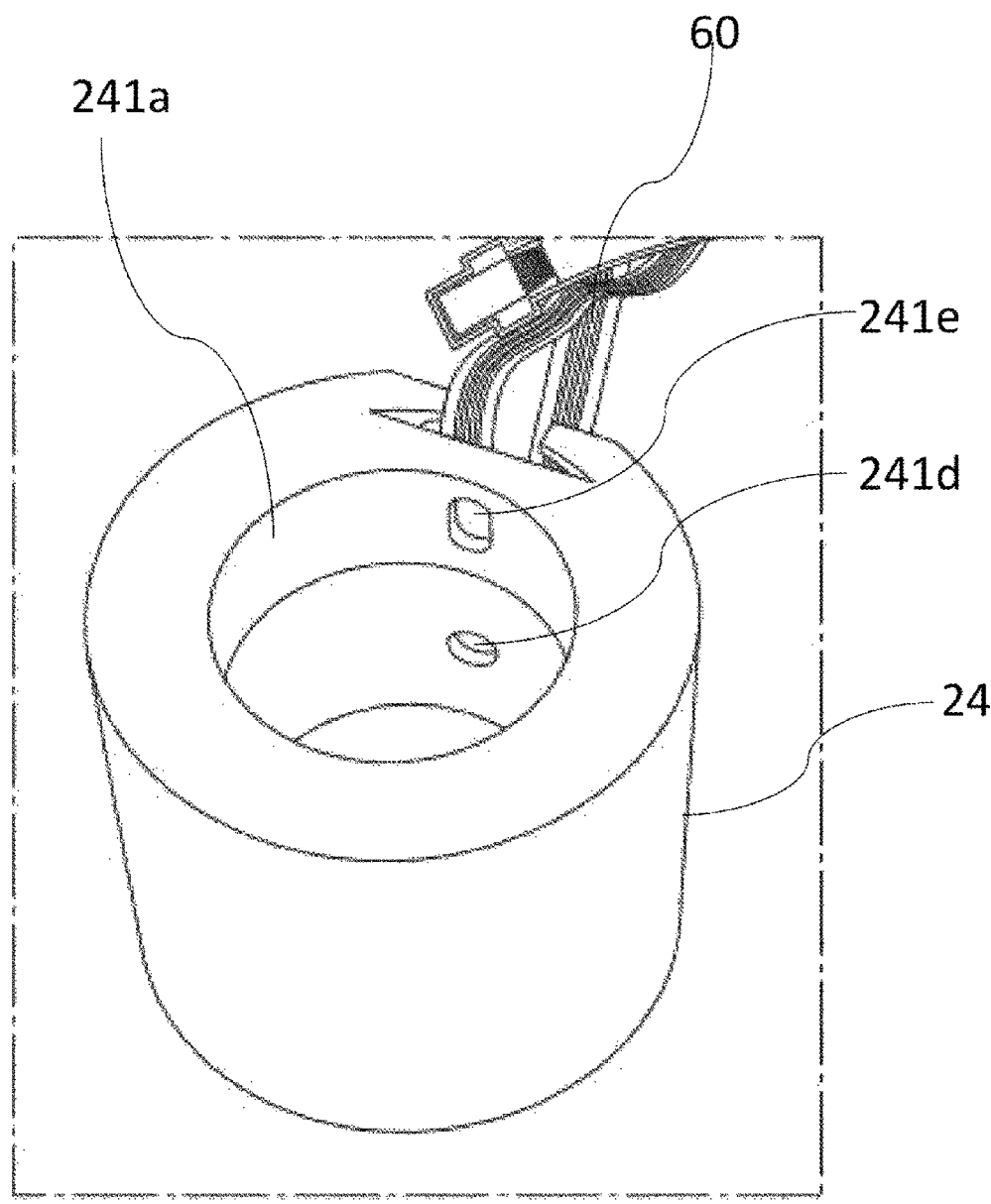
FIG. 4 is a perspective view of a bonnet included in the valve according to the present embodiment.
Figure 4:

As shown in FIGS. 2 and 4, the sensor bonnet 24 has a substantially cylindrical shape, and is accommodated in the first bonnet body 21 in such a way as to cover the valve chamber 112.

A through-hole 241a into which the disc 23 is inserted is formed in the center of the sensor bonnet 24.

In addition, a communication hole 241d communicating with a pressure sensor P and the temperature sensor T is provided in the sensor bonnet 24. As a result of providing the pressure sensor P and the temperature sensor T via the communication hole 241d, it is possible to measure pressure and temperature in a space defined by the diaphragm 22, the disc 23, and the sensor bonnet 24.

Note that the present embodiment is based on the assumption that the temperature sensor T is provided inside the sensor bonnet 24, but the temperature sensor T just needs to be provided inside the valve body 1, and particularly, at least a temperature detection portion of the temperature sensor T just needs to be placed inside the valve body 1. With this configuration, it is possible to accurately measure temperature in the valve V by merely installing the valve V without separately performing work or the like for installation of the temperature sensor.

Furthermore, a flexible cable 60 extends outward from a side surface of the sensor bonnet 24. The flexible cable 60 is connected to the pressure sensor P, the temperature sensor T, and the magnetic sensor M located inside the sensor bonnet 24.

The magnetic body M2 held by the sensor holder 241 is attached to the inner peripheral surface of the sensor bonnet 24, and forms the magnetic sensor M to be described below, together with the magnet attached to the disc 23.

The sensor bonnet 24 is made of an aluminum material. Since aluminum materials have a higher thermal conductivity than, for example, steel use stainless (SUS), fluid temperature can be e more accurately transmitted to the temperature sensor T located inside the sensor bonnet 24. In addition, since the sensor bonnet 24 made of an aluminum material is not magnetized, it is possible to make the temperature sensor T and the pressure sensor P less likely to be affected by the magnetic sensor M.

The holder adapter 26 is in contact with the peripheral edge portion 222 of the diaphragm 22 such that the diaphragm 22 is sandwiched between the holder adapter 26 and the protrusion 121a in the recess 12a of the valve body 1. In addition, the holder adapter 26 presses the peripheral edge portion 222 from above to prevent fluid flowing through the inflow path 111 and the outflow path 113 from leaking to the outside from the vicinity of the peripheral edge portion 222.

The holder adapter 26 does not come into contact with the movable portion of the diaphragm 22, that is, the central portion 221, regardless of whether the valve V is open or closed. Furthermore, an area of contact between the holder adapter 26 and the diaphragm 22 is also constant regardless of whether the valve V is open or closed. This configuration makes the heat transfer area of the diaphragm 22 constant regardless of whether the valve V is open or closed. As a result, since conductive heat from the diaphragm 22 becomes constant, it is possible to accurately measure temperature by means of the temperature sensor T to be described below regardless of whether the valve V is open or closed.

Second Bonnet Portion 4

The second bonnet portion 4 is disposed on the first bonnet portion 2.

As shown in FIG. 2, the second bonnet portion 4 includes the second bonnet body 41, the stem 43, and a spring 44.

The second bonnet body 41 is interposed between the stem 43 and the sensor bonnet 24.

The second bonnet body 41 has a substantially columnar shape, and has a central portion in which a through-hole 41a is provided along the length direction. The stem 43 and the disc 23 are inserted into the through-hole 41a. As shown in FIGS. 2, 3A, and 3B, the stem 43 and the disc 23 are in contact with each other in the through-hole 41a, and when the stem 43 is displaced downward, the disc 23 is pressed downward to bring the diaphragm 22 into contact with the seat 13.

The stem 43 moves up and down in response to supply of operation pressure and a stop of supply of operation pressure, and brings the diaphragm 22 into contact with and separates the diaphragm 22 from the seat 13 via the disc 23 and the diaphragm holder 25.

A rod 431 is coupled to an upper portion of the stem 43. The rod 431 protrudes from an upper portion of the second bonnet portion 4, and is inserted into the actuator unit 5.

Note that since the rod 431 is coupled to the stem 43 to move up and down integrally, the rod 431 may be treated synonymously with the stem 43.

A lower portion of the stem 43 is formed as an enlarged diameter portion, and an upper surface of the enlarged diameter portion receives biasing force from the spring 44.

The spring 44 is wound around an outer peripheral surface of the stem 43, and is in contact with the upper surface of the enlarged diameter portion formed in the lower portion of the stem 43, to bias the stem 43 downward, that is, bias the stem 43 in a direction in which the diaphragm 22 is depressed.

Actuator Unit 5

As shown in FIG. 2, the actuator unit 5 is a bottomed cylindrical member having a supply port 51 to which a supply source of driving fluid is connected. The supply port 51 is an opening communicating with an operation pressure introduction path 511 formed in an upper portion of the rod 431, and the operation pressure introduction path 511 extending in an axial direction of the rod 431 branches in a radial direction thereof to communicate with operation pressure chambers 52.

A pair of pistons 54 engaging with the rod 431 are provided and arranged one above the other in the actuator unit 5 such that the pistons 54 can vertically slide.

A space in which each piston 54 is provided is partitioned into the operation pressure chamber 52 and an atmospheric air chamber 55.

Each operation pressure chamber 52 communicates with the operation pressure introduction path 511 formed in a central portion of the rod 431, via a branch path. An opening of the rod 431, which is located on a side on which an upper end of the operation pressure introduction path 511 is located, communicates with the supply port 51 formed in an upper center portion of the actuator unit 5. Driving fluid supplied through the operation pressure introduction path 511 is supplied to the operation pressure chambers 52.

The atmospheric air chambers 55 each communicate with the atmosphere through an air discharge path 551 formed in an upper portion or a side of the actuator unit 5.

An O-ring O2 is provided between each piston 54 and an inner wall of the actuator unit 5 and between the rod 431 and each piston 54 so as to ensure airtightness of the operation pressure chambers 52. The O-rings O2 slide up and down as the pistons 54 move up and down.

Here, mention will be made of opening/closing operation of the valve V accompanying the supply and stop of supply of operation pressure. When driving fluid is supplied from a three-way valve connected to the supply port 51 via an introduction pipe (not shown), the driving fluid is introduced into the operation pressure chambers 52 through the operation pressure introduction path 511. When the pistons 54 move upward accordingly, the stem 43 and the sensor bonnet 24 are pushed upward against the biasing force of the spring 44, so that air in the atmospheric air chambers 55 is discharged to the outside through the air discharge path 551. As a result, the diaphragm 22 is separated from the seat 13 to open the valve V, so that the fluid flows.

Meanwhile, when the supply of driving fluid is blocked in the three-way valve, and the supply port 51 and the operation pressure introduction path 511 are opened to the atmosphere via the introduction pipe (not shown), operation pressure in the operation pressure chambers 52 is released to the outside through the operation pressure introduction path 511. When pressure in the operation pressure chambers 52 decreases accordingly, the pistons 54 descends, and the stem 43 and the sensor bonnet 24 are pushed downward according to the biasing force of the spring 44. Furthermore, external air flows into the atmospheric air chambers 55 through the air discharge path 551. As a result, the diaphragm 22 comes into contact with the seat 13 to close the valve V, so that the flow of the fluid is blocked.

Sensor

The valve V includes, as sensors for detecting operation in the device, the pressure sensor P, the temperature sensor T, the magnetic sensor M, and an operation pressure sensor D. The pressure sensor P, the temperature sensor T, and the magnetic sensor M are provided inside the sensor bonnet 24 in such a way as to face the through-hole 241a of the sensor bonnet 24 via the communication hole 241d of the sensor bonnet 24 shown in FIG. 4, and communicate with the space defined by the diaphragm 22, the disc 23, and the sensor bonnet 24. As a result, the pressure sensor P can detect pressure in the space.

Note that a seal member such as packing is provided at a portion where the pressure sensor P communicates with the communication hole 241d, so as to ensure airtightness.

The temperature sensor T measures the temperature of the space defined by the diaphragm 22, the disc 23, and the sensor bonnet 24. According to the valve V including the temperature sensor T, measurement of the temperature of fluid can be performed together with control of the fluid.

The magnetic body M2 is attached to a through-hole 241e of the sensor bonnet 24. The magnetic body M2 forms the magnetic sensor M together with the magnet attached to the disc 23, and serves as a position sensor that detects the position of the stem 43.

The magnetic sensor M can detect the opening/closing operation of the valve V and the amount of movement of the stem 43 as follows. That is, while the magnet held by the magnet holder M10 slides according to the up-and-down movement of the disc 23, the magnetic body M2 is fixed in the valve body 1 together with the sensor bonnet 24. As a result, it is possible to detect motion of the disc 23 and the diaphragm holder 25, eventually, the opening/closing operation of the valve V and the amount of movement of the stem 43, based on a change in a magnetic field generated between the magnet held by the magnet holder M10 that moves up and down according to the up-and-down movement of the disc 23 and the magnetic body M2 the position of which is fixed.

The magnetic sensor M is an example of a position sensor, and is an example of an opening and closing sensor that detects at least whether the valve V is open or closed. Note that although the magnetic sensor M is used in the present embodiment, the present invention is not limited thereto, and other types of sensor such as an optical position sensor can be used in other embodiments.

The operation pressure sensor D is included in the actuator unit 5, and detects operation pressure in the operation pressure chamber 52 via a communication hole 53 communicating with the operation pressure chamber 52.

One end of the flexible cable 60, which is a flexible communication cable, is connected to each of the pressure sensor P, the temperature sensor T, the magnetic sensor M, and the operation pressure sensor D (specifically, the magnetic sensor M is connected to the magnetic body M2), and another end of the flexible cable 60 is connected to a circuit board provided outside the valve V. Furthermore, the circuit board is provided with a substantially rectangular connector for connection with an external terminal. It is thus possible to extract data measured by the pressure sensor P, the temperature sensor T, and the magnetic sensor M. The type and shape of the connector can be appropriately designed according to various standards. Note that data detected by each sensor may be transmitted to a predetermined device or server through wireless communication.

According to the valve V having such a configuration, data detected by the pressure sensor P, the temperature sensor T, the magnetic sensor M, and the operation pressure sensor D can be output to the outside. In addition, such data may serve as information for grasping the opening/closing operation of the valve V and an operating time corresponding thereto, leakage due to breakage or the like of the diaphragm 22, aging deterioration of the valve V, variation between individual valves V, and the like.

Control Unit

Figure 5:
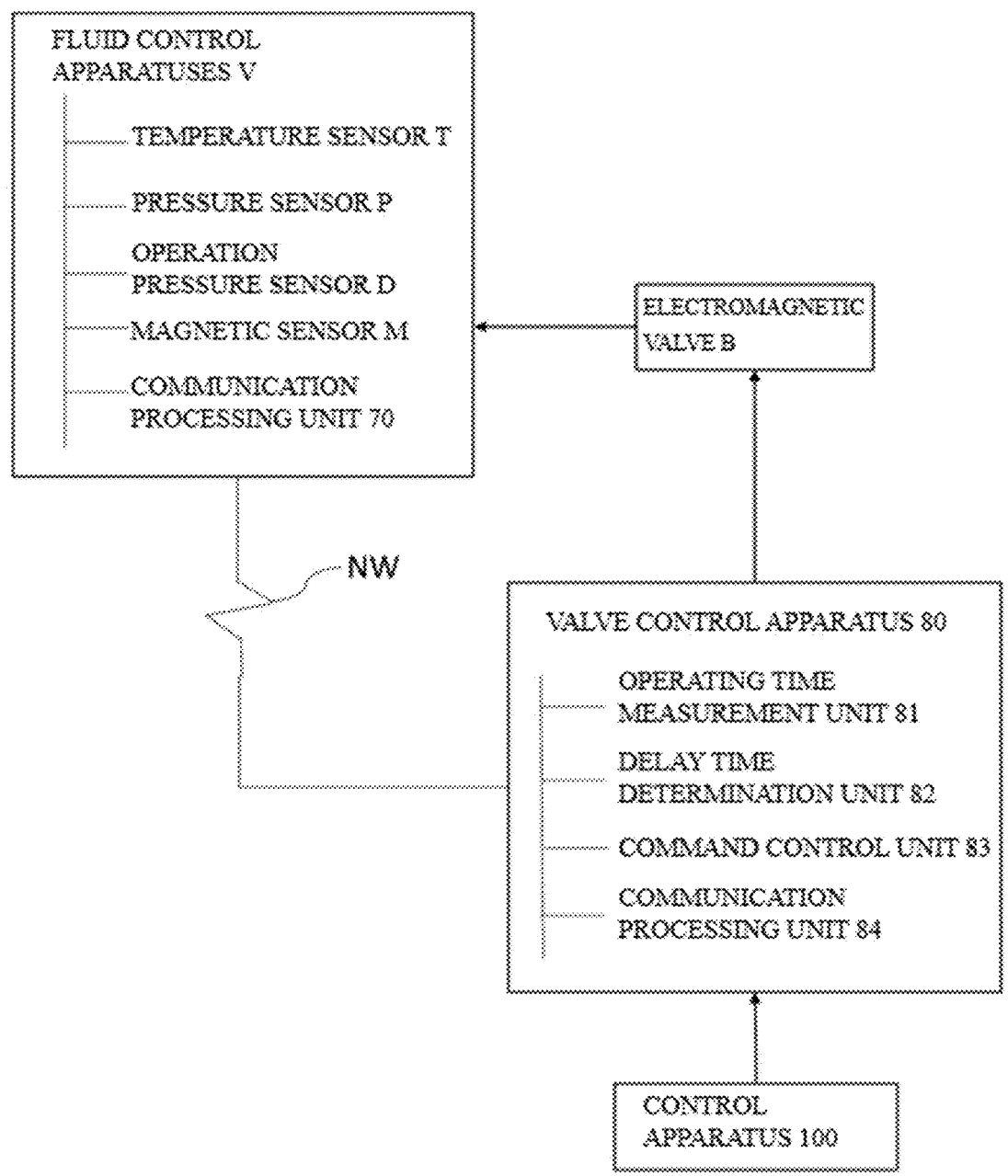
FIG. 5 is a functional block diagram showing functions of the valve according to the present embodiment.

As shown in FIG. 5, the valve V according to the present embodiment includes a communication processing unit 70 that communicates with a valve control apparatus 80 for exchanging data detected by the sensors. In the example of FIG. 5, the valve V and a valve control apparatus 80 are connected via a network NW. Furthermore, a control apparatus 100 is connected to the valve control apparatus 80, and transmits an opening command and a closing command for controlling the opening and closing of the valve V. The opening command and the closing command are transmitted to an electromagnetic valve B via the valve control apparatus 80. The electromagnetic valve B is disposed in the flow path of driving fluid, and the valve V opens and closes according to the opening and closing of the electromagnetic valve B.

Valve Control Apparatus 80

The valve control apparatus 80 is, for example, a server, and is implemented by one or more hardware configurations. In addition, some or all of functional units of the valve control apparatus 80 may be implemented by cloud computing.

The valve control apparatus 80 mainly includes an operating time measurement unit 81, a delay time determination unit 82, a command control unit 83, and a communication processing unit 84 that are functional blocks to be implemented by, for example, a central processing unit (CPU), a computer program to be executed by the CPU, and a random access memory (RAM) and a read only memory (ROM) that store the computer program and predetermined data.

The operating time measurement unit 81 is a functional unit that measures the operating time of the valve V based on operation pressure applied to the valve V and whether the valve V is open or closed. The operating time is, for example, a time from a predetermined time point at which the operation pressure is applied to the valve V to a predetermined time point during opening operation of the valve V.

Figure 6:
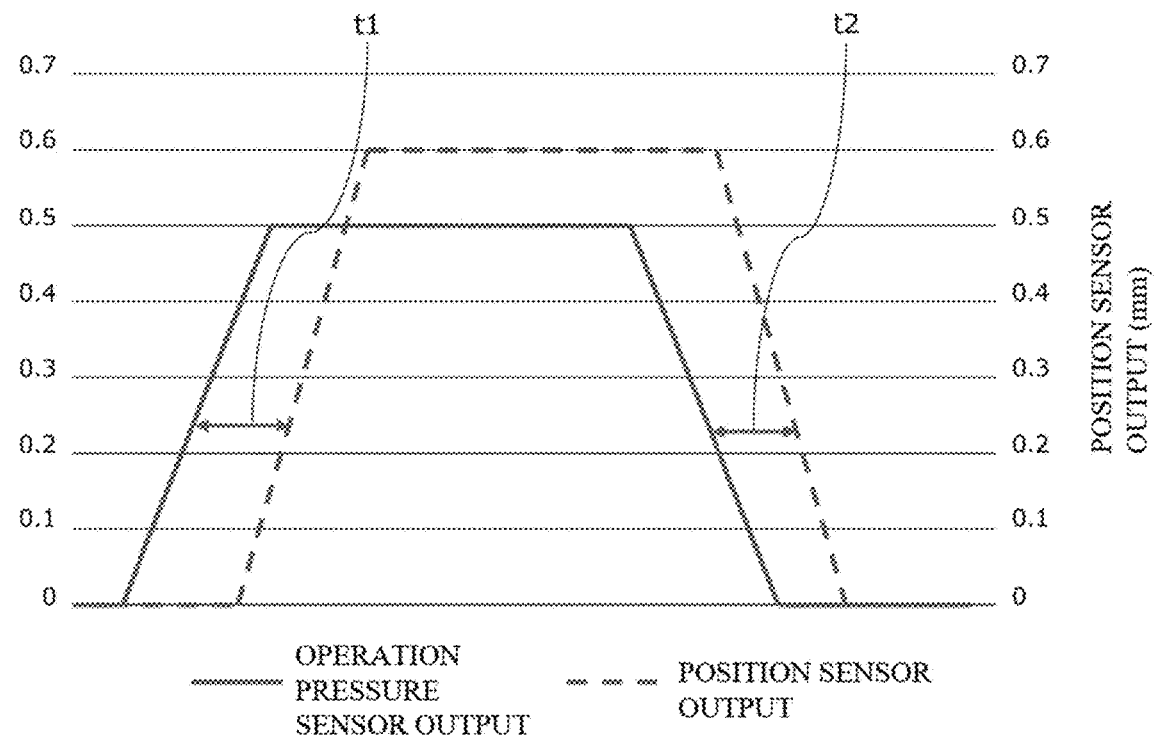
FIG. 6 is a graph showing a relationship between operation pressure and position sensor output based on which an operating time of the valve according to the present embodiment is calculated.

FIG. 6 shows an image of calculation of an operating time, where the horizontal axis indicates time change, and the vertical axis indicates the output value of the operation pressure sensor D and the output value of the position sensor. It is understood from this graph that when an opening command is issued to the electromagnetic valve B and operation pressure is introduced into the operation pressure chamber 52, the stem 43 upward and the position sensor (magnetic sensor M) shows a predetermined output value. It is also understood from this graph that when a closing command is issued to the electromagnetic valve B and the operation pressure in the operation pressure chamber 52 is released, the stem 43 descends after a certain time lag and the position sensor (magnetic sensor M) shows a predetermined output value. This time lag, that is, time from a predetermined time point at which operation pressure changes to a predetermined time point at which operation corresponding thereto is detected by the position sensor (magnetic sensor M), corresponds to the operating time of the opening/closing operation of the valve V. For example, time t1 shown in FIG. 6 indicates operating time of opening operation, and time t2 indicates second operating time of closing operation.

Note that an operation pressure serving as the starting point of an operating time and a position sensor output serving as the end point thereof are predetermined values that are freely set, and values of the axes shown on the left and right of FIG. 6 are merely examples. The operating time measurement unit 81 acquires an operating time with reference to results of measurement performed by the operation pressure sensor D and the magnetic sensor M, the results being acquired from the valve V via the communication processing unit 84.

The delay time determination unit 82 is a functional unit that determines a delay time for an opening command to be transmitted to the electromagnetic valve B, based on a difference between the operating time measured by the operating time measurement unit 81 and a reference time. Specifically, the delay time is an absolute value to be obtained from a formula "reference time−operating time". The reference time is an appropriate value of time from application of pressure to the valve V to opening operation. The reference time may be a value stored in advance in an appropriate storage unit. Furthermore, the reference time may be a value stored after being obtained by measurement of an operating time in an initial state at the start of use of the valve V. Furthermore, the reference time may be a design value of the operating time of the valve V.

Operating time of the valve V tends to be shortened mainly due to a long-term change of properties or characteristics of the valve's physical structure, such as wear of the O-ring O2 (see FIG. 2). When operating time is shortened, the timings of opening operation and closing operation to be performed in response to the opening/closing command of the valve V change from the initial state, so that process gas cannot flow at specified rate. That is, shortened operating time for opening the valve will lengthen a time period during which the valve is open to allow fluid to flow, that is, opening time, so that process gas flows at a flow rate larger than the specified flow rate. In addition, as operating time for closing the valve is shortened, the opening time is shortened, so that that process gas flows at a flow rate smaller than the specified flow rate (note that, hereinafter, the operating time for closing the valve may be referred to as a "second operating time"). Therefore, the delay time to be obtained by the above-described formula "reference time-operating time" is expressed as "reference time-operating time=delay time >0", and it is thus possible to cause the operating time for opening the valve to match the reference time, by delaying the opening command for the delay time by means of the command control 83 to be described below.

In addition, in a normally closed valve as in the present configuration, response speed tends to be slower in opening operation than in closing operation due to the influence of a relationship between, for example, the frictional force of the O-ring and the biasing force of the spring. That is, in the valve V according to the present embodiment, since the spring 44 is constantly biased in a closing direction, time required to close the valve by means of the biasing force of the spring 44 exceeding the frictional force of the O-ring O2 by releasing operating pressure from the operation pressure chamber 52 in closing operation is shorter than time required to open the valve by applying operation pressure in the operation pressure chamber 52 to generate force exceeding the biasing force of the O-ring O2. Therefore, a change in the operating time due to wear of the O-ring O2, or the like is likely to occur in opening operation.

The command control unit 83 is a functional unit that receives an opening command or closing command directed to the valve and transmitted from the control apparatus 100, and transmits the opening command or closing command to the electromagnetic valve B in a delayed manner. For example, when receiving an opening command from the control apparatus 100, the command control unit 83 is kept on standby for a delay time determined by the delay time determination unit 82, and then transmits the opening command to the electromagnetic valve B.

Therefore, the delay time determination unit 82 compares, with the reference time, an operating time from a time point at which applied operation pressure has changed to a time point of opening operation detected based on a change in the output of the magnetic sensor M, and determines a delay time based on a difference between the operating time and the reference time. According to this configuration, it is possible to delay the timing of opening the valve V, and to shorten the opening time of the valve V. As a result, it is possible to ensure that process gas is controlled by the valve V in such a way as to flow at the specified flow rate even in a case where the operating time of the valve V has been shortened due to aging deterioration or the like.

In addition, the operating time measurement unit 81 may acquire, as the second operating time for closing the valve, time from a time point at which operation pressure applied to the valve V is released to a time point of closing operation detected based on a change in the output of the magnetic sensor M. The delay time determination unit 82 determines a second delay time to be provided for a closing command, based on a difference between the second operating time for closing the valve and a predetermined second reference time. The second reference time is an appropriate value of time from release of pressure from the valve V to closing operation, and may be not only a value stored in advance in the appropriate storage unit but also a value stored after being obtained by measurement of the second operating time in the initial state at the start of use of the valve V. Furthermore, the second reference time may be a design value of the second operating time of the valve V. The second reference time is set separately from a first reference time. Furthermore, the second delay time is determined independently of a first delay time.

Upon receiving a closing command from the control apparatus 100, the command control unit 83 is kept on standby for the second delay time, and then transmits the closing command to the electromagnetic valve B. According to such a configuration, it is possible to ensure that process gas is controlled by the valve V in such a way as to flow at the specified flow rate even in a case where the second operating time for closing the valve V has been shortened.

Furthermore, the delay time determination unit 82 may determine a delay time for an opening command with reference to the operating time and the second operating time for opening operation and closing operation, respectively. In closing operation, operating time is shortened due to aging deterioration, so that opening time is shortened. Therefore, according to this configuration, the delay time and the second delay time for opening operation and closing operation are determined based on the reference time and the second reference time for the opening operation and the closing operation, respectively, and an opening command is delayed based on a third delay time obtained by an offset of the delay time against the second delay time. According to this configuration, opening time can be more appropriately controlled. Furthermore, specifically, the difference between closing operation and opening operation described above leads to "delay time>second delay time", so that the third delay time is obtained from a formula "delay time−second delay time".

The communication processing unit 84 is a functional unit that communicates with the control apparatus 100 and the electromagnetic valve B. The communication processing unit 84 receives an opening command and a closing command from the control apparatus 100. The communication processing unit 84 receives results of measurement performed by the operation pressure sensor D and the magnetic sensor M from the communication processing unit 70 of the valve V. Furthermore, the communication processing unit 84 transmits the opening command and the closing command to the electromagnetic valve B.

Processing Flow

Figure 7:
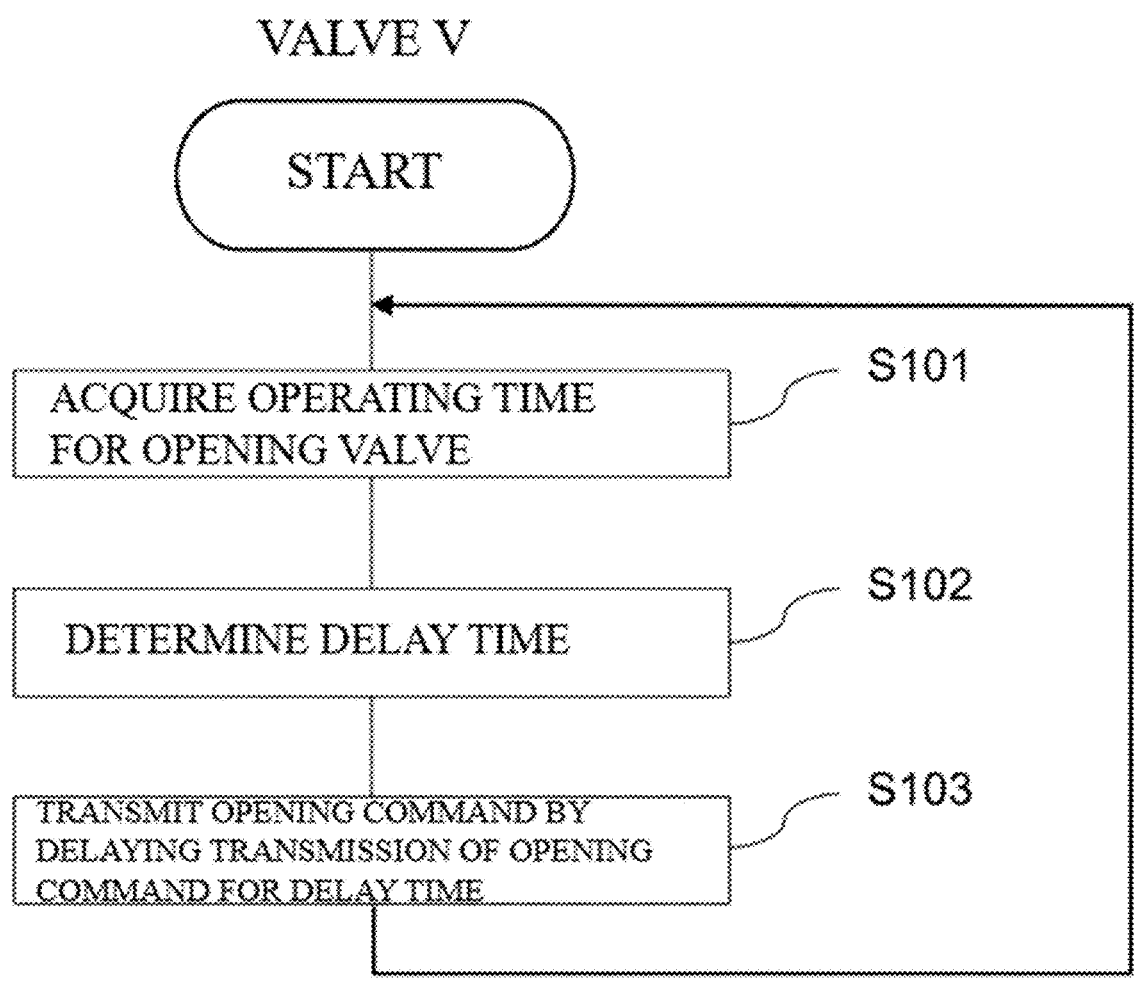
FIG. 7 is a processing flowchart showing a flow of processing to be executed by the valve according to the present embodiment.

A processing flow in which the valve control apparatus 80 transmits an opening command to the electromagnetic valve B will be described with reference to FIG. 7.

First, the operating time measurement unit 81 of the valve control apparatus 80 receives results of measurement performed by the operation pressure sensor D and the magnetic sensor M, and acquires time from application of operation pressure to opening operation, that is, an operating time for opening the valve (step S101).

Next, the delay time determination unit 82 determines a delay time for an opening command with reference to the operating time and the reference time (step S102).

Next, the command control unit 83 transmits the opening command to the electromagnetic valve B by delaying transmission of the opening command for the delay time (step S103). Then, the process returns to step S101, and thereafter, the processing from steps S101 to S103 is periodically repeated.

Figure 8:
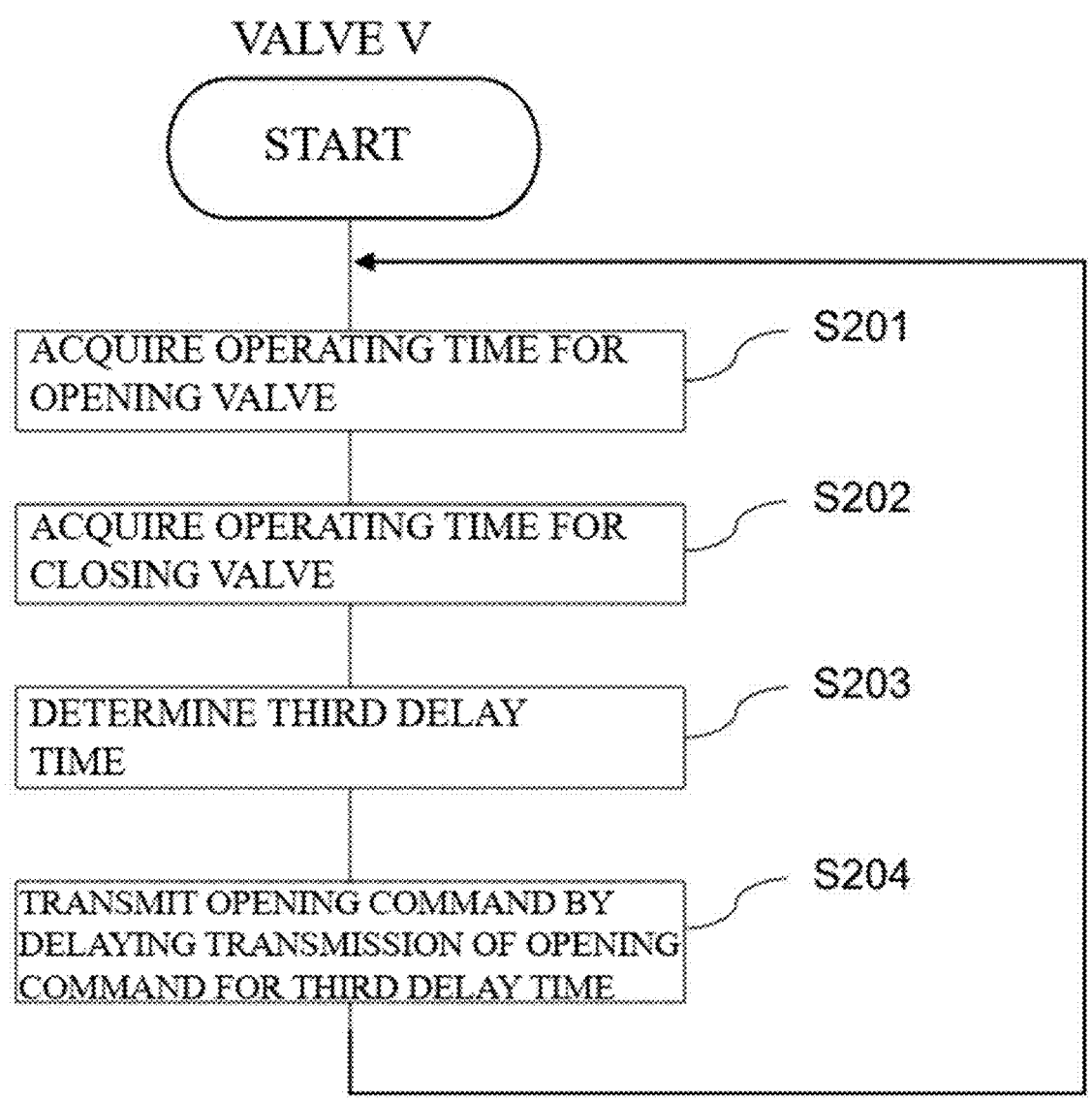
FIG. 8 is a processing flowchart showing a flow of processing to be executed by the valve according to the present embodiment.

FIG. 8 is another embodiment of the processing flow to be executed by the valve control apparatus 80, and is a processing flow of transmitting an opening command by delaying transmission of the opening command for a delay time determined with reference to an operating time of each of the opening command and a closing command.

First, the operating time measurement unit 81 calculates an operating time for opening the valve (step S201). In addition, the operating time measurement unit 81 receives results of measurement performed by the operation pressure sensor D and the magnetic sensor M, and calculates time from release of a predetermined amount of operation pressure to closing operation, that is, a second operating time for closing the valve (step S202). Steps S201 and S202 are in no particular order, and may be performed simultaneously.

Next, the delay time determination unit 82 determines a third delay time with reference to the operating time for opening the valve, the second operating time for closing the valve, the reference time, and the second reference time (step S203).

Next, the command control unit 83 transmits the opening command to the electromagnetic valve B by delaying transmission of the opening command for the third delay time (step S204). Then, the process returns to step S201, and thereafter, the processing from steps S201 to S204 is periodically repeated.

The valve V according to the present embodiment described above makes it possible to monitor a change in operating time due to a long-term change of properties or characteristics of physical structure of a valve actuator, or the like. Furthermore, according to the valve control apparatus 80, it is possible to precisely adjust the operating time of the valve V with a simple configuration by adjusting a time point of transmission of an opening command to the electromagnetic valve B based on a change in the operating time.

Note that each functional unit of the valve control apparatus 80 may be included in the control apparatus 100. However, according to the configuration in which the valve control apparatus 80 is implemented as a hardware configuration independent of the control apparatus 100, it is possible to precisely adjust the operating time of the valve V by connecting the valve control apparatus 80 to any desired control apparatus 100. That is, the valve control apparatus 80 offers high convenience since it is possible to adjust operating time without modifying a system of the control apparatus 100.

Note that operating time regarding operation to be performed in response to a control signal for the valve V tends to be shortened mainly due to a long-term change of properties or characteristics of the valve's physical structure, such as wear of the O-ring O2 (see FIG. 2), but the progress of aging of the O-ring O2 tends to cause a decrease in response speed due to, for example, increase of leakage in the actuator unit 5 (see FIG. 2). Therefore, it is possible to determine an anomaly in the valve V by monitoring a change in the response speed and detecting a timing at which the response speed starts to decrease.

Although the present invention has been described by use of the embodiment, the technical scope of the present invention is not limited to the scope described in the above embodiment, and various modifications and changes can be made within the scope of the gist of the present invention.

What is claimed is:

1. A valve control apparatus comprising:
   an operating time measurement unit configured to:
      receive from a pressure sensor an operation pressure being applied to a valve and receive from an opening and closing sensor a detection of whether the valve is open or closed, and
      measure an operating time of the valve, as a measured operating time that is based on a combination of the operation pressure of the valve and the detection of whether the valve is open or closed;
   a delay time determination unit configured to determine a delay time, based on a combination of the measured operating time and a predetermined reference time; and
   a command control unit configured to receive an opening command that is directed to an opening/closing operation of the valve and is transmitted from a control apparatus, and, in response, to transmit the opening command to the valve at a transmit time that is delayed, by the delay time, from a time at which the command control unit receives the opening command,
   wherein the predetermined reference time is a stored value of a reference amount of time that extends between an application of pressure to the valve and a corresponding opening operation of the valve.

2. The valve control apparatus according to claim 1, wherein the
   delay time determination unit is further configured to determine the delay time based on a difference between the measured operating time and the predetermined reference time.

3. The valve control apparatus according to claim 2, wherein
   the operating time measurement unit is further configured to receive from the opening and closing sensor a valve position measurement,
   the delay time determination unit is further configured to:
      detect an opening operation based on the valve position measurement, and
      use, as the operating time, a time from a first predetermined time point at which the measured operation pressure increases to a second predetermined time point at which the valve position measurement indicates the opening operation corresponding to the measured operation pressure increase.

4. The valve control apparatus according to claim 2, wherein the operating time is a first operating time, and wherein
   the operating time measurement unit is further configured to receive from the opening and closing sensor a valve position measurement, and
   the delay time determination unit is further configured to:
      use, as the first operating time, a time from a first predetermined time point at which the measured operation pressure is increasing to a second predetermined time point at which an opening operation corresponding to the measured operation pressure increase is detected, based on the valve position measurement,
      use, as a second operating time, a time from a third predetermined time point at which the measured operation pressure decreases to a predetermined time point at which a closing operation corresponding to the decrease is detected, based on the valve position measurement, and
      determine the delay time based on the first operating time, the reference time, the second operating time, and a predetermined second reference time.

5. A valve control method comprising:
   an operating time measurement step, including:
      receiving from a pressure sensor a measured operation pressure applied to a valve,
      receiving from an opening and closing sensor a detection of whether the valve is open or closed, and
      measuring an operating time of the valve, as a measured operating time, based on the measured operation pressure applied to the valve and the detection of whether the valve is open or closed;
   a step of determining a delay time, based on a combination of the measured operating time and a predetermined reference time; and
   an opening command control step of receiving, from a control apparatus, an opening command that is directed to an opening/closing operation of the valve and, in response, transmitting the opening command to the valve in a delayed manner based on the operating time and a predetermined reference time,
   wherein the predetermined reference time is a stored value of a reference amount of time that extends between an application of pressure to the valve and a corresponding opening operation of the valve.

6. A valve control program for causing a computer to execute:
   an operating time measurement command to:
      receive from a pressure sensor an operation pressure applied to a valve and receive from an opening and closing sensor a detection of whether the valve is open or closed, and
      measure an operating time of the valve, as a measured operating time, wherein the measured operating time is based on a combination of the operation pressure of the valve and the detection of whether the valve is open or closed;

a delay time determination command to determine a delay time based on a combination of the measured operating time and a predetermined reference time; and an opening control command to receive, from a control apparatus, an opening command that is directed to an opening/closing operation of the valve and, in response, to transmit the opening command to the valve at a transmit time that is delayed, by the delay time, from a time at which the command control unit receives the opening command, wherein the predetermined reference time is a stored value of a reference amount of time that extends between an application of pressure to the valve and a corresponding opening operation of the valve.

7. A valve control system, comprising:

a valve;

a control apparatus that is configured to transmit an opening command that is directed to an opening/closing operation of the valve;

a valve control apparatus that is configured to adjust, as an operating time, time from a predetermined time point at which operation pressure changes to a predetermined time point at which operation corresponding to the change is detected, the operation pressure being applied to the valve, wherein the valve includes:
- an operation pressure sensor that is configured to measure the operation pressure applied to the valve and output, in response, a measured operation pressure applied to the valve; and
- an opening and closing sensor that is configured to detect at least whether the valve is open or closed and output, in response, a detection of whether the valve is open or closed, and the valve control apparatus includes:
- an operating time measurement unit that is configured to:
  - receive from the pressure sensor the measured operation pressure applied to the valve, and
  - measure the operating time, as a measured operating time, based on the measured operation pressure applied to the valve and the detection of whether the valve is open or closed;
- a delay time determination unit that is configured to determine a delay time based on a combination of the measured operating time and a predetermined reference time, wherein the predetermined reference time is a stored value of a reference amount of time that extends between an application of pressure to the valve and a corresponding opening operation of the valve; and
- a command control unit that is configured to receive, from the control apparatus, the opening command that is directed to the opening/closing operation of the valve and, in response, to transmit the opening command to the valve at a transmit time that is in a delayed, by the delay time, from a time at which the command control unit received the opening command.

8. The valve control system of claim 7, wherein the delay time determination unit is further configured to determine the delay time based on a difference between the measured operating time and the predetermined reference time.

9. The valve control method of claim 5, wherein the step of determining the delay time is further based on a difference between the measured operating time and the predetermined reference time.

10. The valve control program of claim 6, wherein to determine the delay time is further based on a difference between the measured operating time and the predetermined reference time.

* * * * *